United States Patent
Goto

[11] 3,879,111
[45] Apr. 22, 1975

[54] MICROSCOPE OBJECTIVE
[75] Inventor: Atsuo Goto, Hachioji, Tokyo, Japan
[73] Assignee: Olympus Optical Co., Ltd., Tokyo, Japan
[22] Filed: Feb. 5, 1974
[21] Appl. No.: 439,756

[30] Foreign Application Priority Data
Feb. 10, 1973 Japan.............................. 48-16875

[52] U.S. Cl. .......... 350/216; 350/175 ML; 350/177
[51] Int. Cl. ........................ G02b 9/60; G02b 21/02
[58] Field of Search ..... 350/175 ML, 216, 176, 177

[56] References Cited
UNITED STATES PATENTS
3,481,665   12/1969   Rosenberger.................. 350/216 X Primary Examiner—John K. Corbin

[57] ABSTRACT

A microscope objective comprising eight lenses arranged in five components successively, the first component being a negative meniscus lens with a forwardly concave front face, the second component being a positive meniscus lens with a forwardly concave front face, the third component being a biconvex doublet, the fourth component being a positive meniscus doublet with a forwardly concave front face, and the fifth component being a negative meniscus doublet with a forwardly convex front face.

1 Claim, 6 Drawing Figures

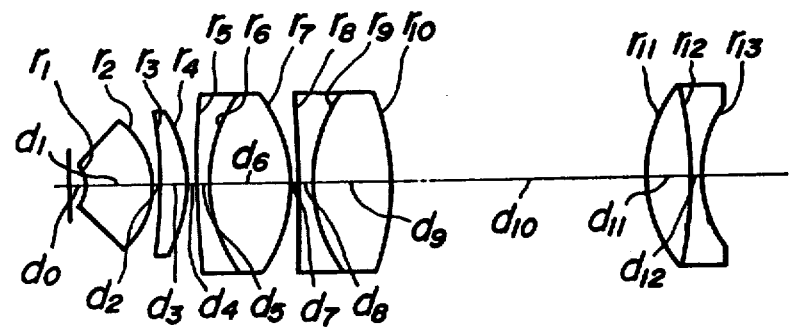
FIG_1
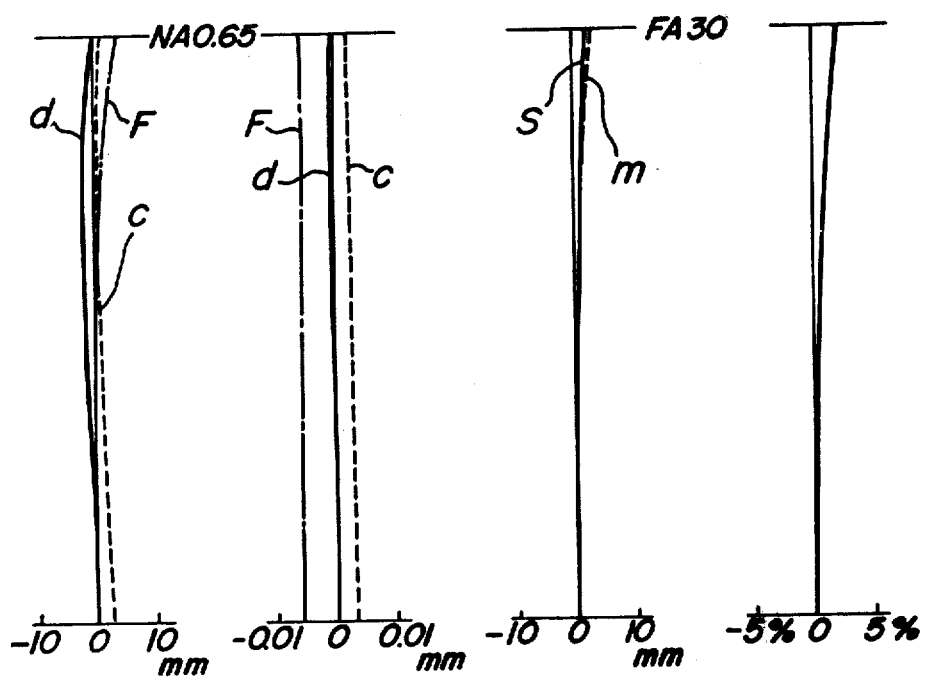

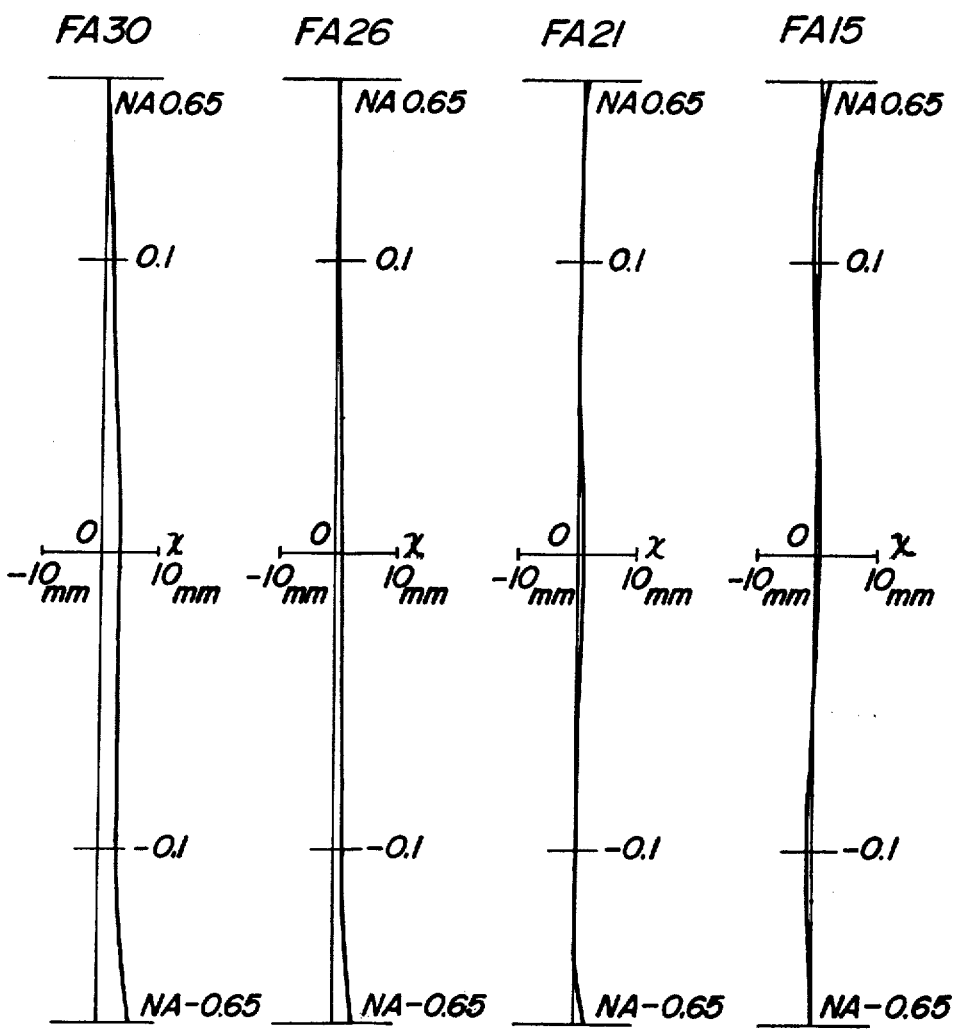
FIG_2E

MICROSCOPE OBJECTIVE

This invention relates to microscope objectives and more particularly to a dry achromatic objective for metallurgical microscopes and having flatness of the field of view in images. Achromatic objectives heretofore proposed have had field apertures FA on the order of at most 20.

An object of the invention is to provide a dry achromatic objective for metallurgical microscopes and designed to operate with a large field aperture, upwards of 30, with flatness of the field of view in such wide images and with substantial suppression of various aberrations.

The invention now will be described in greater detail with reference to the accompanying drawings, wherein:

FIG. 1 is a cross-sectional view showing the construction of a microscope objective according to the invention; and FIGS. 2A to 2E diagrammatically illustrate various aberration curves as related to the microscope objective shown in FIG. 1.

In FIG. 1 is shown the construction of the microscope objective according to the invention comprising eight lenses arranged in five components successively, the first component being a negative meniscus lens with a forwardly concave front face, the second component being a positive meniscus lens with a forwardly concave front face, the third component being a biconvex doublet, the fourth component being a positive meniscus doublet with a forwardly concave front face, and the fifth component being a negative meniscus doublet with a forwardly convex front face. The microscope objective shown in FIG. 1 is constructed according to the constructional data given herebelow:

$f=5.066$  $NA=0.65$  $\beta=40X$

| | | $d_0=0.717$ | | |
|---|---|---|---|---|
| $r_1=$ | −2.166 | $d_1=3.92$ | $n_1=1.77370$ | $\nu_1=49.4$ |
| $r_2=$ | −3.77 | $d_2=0.25$ | | |
| $r_3=$ | −28.341 | $d_3=1.68$ | $n_2=1.48656$ | $\nu_2=84.5$ |
| $r_4=$ | −6.864 | $d_4=0.28$ | | |
| $r_5=$ | 56.4 | $d_5=0.88$ | $n_3=1.57501$ | $\nu_3=41.5$ |
| $r_6=$ | 9.205 | $d_6=4.33$ | $n_4=1.48656$ | $\nu_4=84.5$ |
| $r_7=$ | −8.871 | $d_7=0.56$ | | |
| $r_8=$ | −121.77 | $d_8=0.88$ | $n_5=1.80440$ | $\nu_5=39.6$ |
| $r_9=$ | 8.806 | $d_9=4.57$ | $n_6=1.48656$ | $\nu_6=84.5$ |
| $r_{10}=$ | −11.865 | $d_{10}=14.54$ | | |
| $r_{11}=$ | 8.3 | $d_{11}=2.29$ | $n_7=1.72000$ | $\nu_7=50.3$ |
| $r_{12}=$ | −27.195 | $d_{12}=0.78$ | $n_8=1.62012$ | $\nu_8=49.6$ |
| $r_{13}=$ | 5.803 | | | | wherein $r_1$ to $r_{13}$ inclusive designate the radii of curvature of successive lenses, $d_0$ to $d_{12}$ inclusive designate the lens thicknesses and air spaces between the lenses, $n_1$ to $n_8$ inclusive designate the refractive indexes and $\nu_1$ to $\nu_8$ inclusive designate the Abbe numbers of the lenses numbering from the front to the rear of the objective.

In FIG. 2A is graphically represented the spherical aberration related to the objective shown in FIG. 1. In FIG. 2B is graphically represented the sine condition OSC'. In FIG. 2C is graphically represented the astigmatisms, the saggital astigmatism being designated by s and meridional astigmatism being designated by m. In FIG. 2D is graphically represented the distortion. In FIG. 2E is graphically represented the comas.

As seen from the aberration curves shown in FIGS. 2A to 2E, the microscope objective according to the invention is capable of sufficiently attaining flatness of the field of view in microscope images over the entire field aperture of 30. In addition, the invention makes it possible to extremely suppress the coma while retaining the high degree of resolving power over the entire field.

What is claimed is:

1. A microscope objective comprising eight lenses arranged in five components successively, the first component being a negative meniscus lens with a forwardly concave front face, the second component being a positive meniscus lens with a forwardly concave front face, the third component being a biconvex doublet, the fourth component being a positive meniscus doublet with a forwardly concave front face, and fifth component being a negative meniscus doublet with a forwardly convex front face, and constructed according to the constructional data given herebelow:

$f=5.066$  $NA=0.65$  $\beta=40X$

| | | $d_0=0.717$ | | |
|---|---|---|---|---|
| $r_1=$ | −2.166 | $d_1=3.92$ | $n_1=1.77370$ | $\nu_1=49.4$ |
| $r_2=$ | −3.77 | $d_2=0.25$ | | |
| $r_3=$ | −28.341 | $d_3=1.68$ | $n_2=1.48656$ | $\nu_2=84.5$ |
| $r_4=$ | −6.864 | $d_4=0.28$ | | |
| $r_5=$ | 56.4 | $d_5=0.88$ | $n_3=1.57501$ | $\nu_3=41.5$ |
| $r_6=$ | 9.205 | $d_6=4.33$ | $n_4=1.48656$ | $\nu_4=84.5$ |
| $r_7=$ | −8.871 | $d_7=0.56$ | | |
| $r_8=$ | −121.77 | $d_8=0.88$ | $n_5=1.80440$ | $\nu_5=39.6$ |
| $r_9=$ | 8.806 | $d_9=4.57$ | $n_6=1.48656$ | $\nu_6=84.5$ |
| $r_{10}=$ | −11.865 | $d_{10}=14.54$ | | |
| $r_{11}=$ | 8.3 | $d_{11}=2.29$ | $n_7=1.72000$ | $\nu_7=50.3$ |
| $r_{12}=$ | −27.195 | $d_{12}=0.78$ | $n_8=1.62012$ | $\nu_8=49.6$ |
| $r_{13}=$ | 5.803 | | | | wherein $r_1$ to $r_{13}$ inclusive designate the radii of curvature of successive lenses, $d_0$ to $d_{12}$ inclusive designate the lens thicknesses and air spaces between the lenses, $n_1$ to $n_8$ inclusive designate the refractive indexes and $\nu_1$ to $\nu_8$ inclusive designate the Abbe numbers of the lenses numbering from the front to the rear of the objective.

* * * * *